United States Patent [19]

Heller

[11] 4,383,693
[45] May 17, 1983

[54] SEALS FOR DUCTS

[75] Inventor: Ralph N. Heller, Mettmenstetten, Switzerland

[73] Assignee: Grovag Grossventiltechnik AG, Switzerland

[21] Appl. No.: 268,340

[22] Filed: May 29, 1981

[30] Foreign Application Priority Data

Jun. 24, 1980 [GB] United Kingdom ............... 8020684

[51] Int. Cl.³ ............................................. F16J 15/00
[52] U.S. Cl. .................................... 277/204; 277/236
[58] Field of Search ................. 225/224; 277/204, 11, 277/236

[56] References Cited

U.S. PATENT DOCUMENTS 4,063,845 12/1977 Allen .................................. 277/204
4,192,515 3/1980 Smith ................................... 277/11
4,235,480 11/1980 Olschewski et al. ............... 277/204

Primary Examiner—Robert I. Smith
Attorney, Agent, or Firm—St.Onge, Steward, Johnston & Reens

[57] ABSTRACT

A gas-tight seal for the closure of a perimeter space between a duct and a surrounding structure, which space changes due to axial or lateral relative expansion movements of the duct or structure, comprising a spring tempered metal annular diaphragm of generally axially extending sideways overlapping strips or leaf springs, the diaphragm being fixed to an annular member for fixing in relation to the duct or the structure with one margin and sliding with the face of the other margin over a generally axially extending annular seating face under spring pressure of the diaphragm. The spring pressure of the diaphragm may be assisted by bias leaf springs.

5 Claims, 3 Drawing Figures

SEALS FOR DUCTS

This invention relates to seals for ducts.

When a duct is passed through a wall or the like it may be necessary to allow for relative movement between the duct and wall. If the movement were only in the direction of the duct axis then the aperture in the wall would be a fairly close fit around the duct. If, however, the duct may also move in directions at right angles to its axis, then the aperture must be correspondingly larger than the duct.

Difficulty is then experienced in closing this aperture by means which will take up any movement of the duct in the aperture while maintaining the aperture sealed.

Non-metallic bellows type seals may be unsuitable because of temperatures involved or radiations present. Metallic bellows seals may not be able to accommodate the range of movement to be taken up or may be unsuitable for other reasons; for example, they must be fitted before the duct line is closed and can be replaced only after cutting the duct.

U.K. patent specification No. 855 306 describes a seal between a duct and a surrounding structure in which a generally radially extending spring diaphragm is fixed with one margin to the duct or the structure and slides with the flat face of the other margin over a generally radially extending seating face which thus faces generally in the axial direction. This arrangement can therefore allow for a wide range of radial and lateral movement but only a restricted range of axial movement; however, in practice axial expansion will often be greater than radial expansion. Furthermore, relative axial movement tends to tilt the face of the diaphragm relative to the seating face so that only line contact is made. It is also difficult to arrange the seal in such a way that the sealing effect is assisted by the pressure differential across the opening.

The present invention provides a gas-tight seal for the closure of a perimeter space between a duct and a surrounding structure, which space changes due to axial or lateral relative expansion movements of the duct or structure, comprising a spring tempered metal annular diaphragm of generally axially extending, sideways overlapping strips or leaf springs, the diaphragm being fixed to an annular member for fixing in relation to the duct or the structure with one margin and sliding with the face of the other margin over a generally axially extending annular seating face under spring pressure of the diaphragm.

Preferably, the spring pressure of the diaphragm is assisted by auxiliary loading means such as bias leaf springs.

If, as will usually be the case, a pressure differential exists across space between the duct and the structure, it is preferable for the arrangement to be such that this assists the spring pressure of the diaphragm in maintaining contact between the diaphragm and the seating face.

The invention will be described further, by way of example, with reference to the accompanying drawings, in which.

Figure 1:
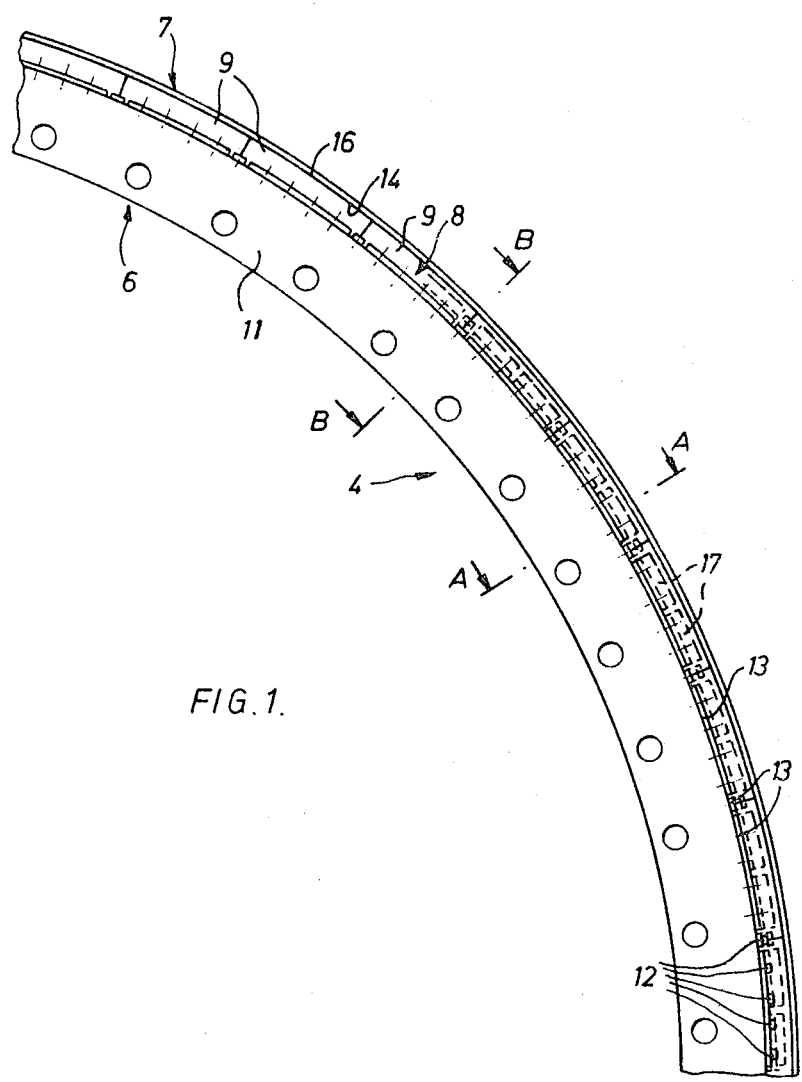
FIG. 1 is an elevation of a quadrant of a seal between a duct and a surrounding structure.
Figure 2:
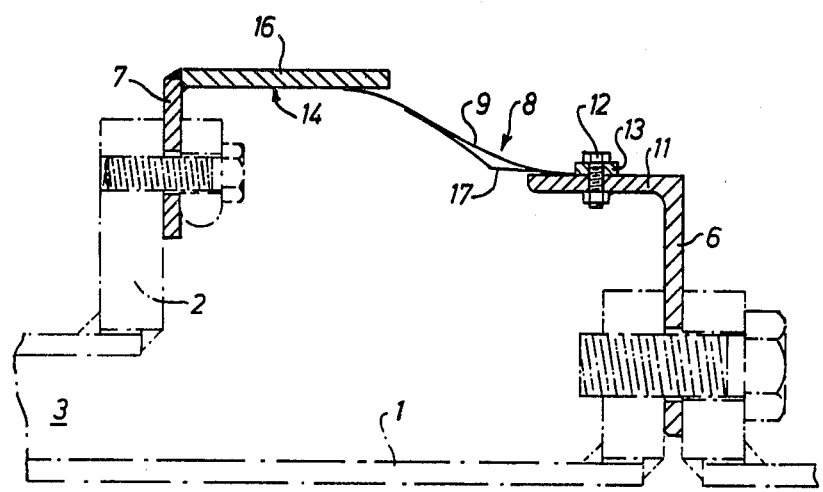
FIG. 2 is an enlarged axial section on line A—A of FIG. 1.
Figure 3:
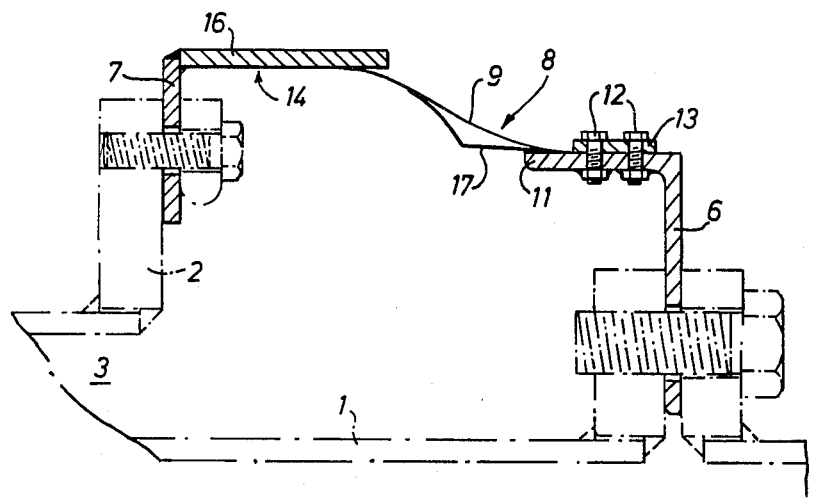
FIG. 3 is an enlarged axial section on line B—B of FIG. 1.

As shown in FIGS. 2 and 3, a duct 1 passes through an opening in a structure 2, the space 3 between the duct and the structure being at a higher pressure than the surroundings. The space is sealed off by a seal 4 allowing for axial and lateral relative movement.

The seal comprises an annular member 6 fixed to the duct 1, an annular member 7 fixed to the structure 2, and a spring tempered metal annular diaphragm 8 of sideways overlapping strips or leaf springs 9. One margin of the diaphragm 8 is fixed to an axially extending annular outer surface of an annular flange 11 of the member 6 by bolts 12 and clamping plates 13. The diaphragm 8 extends generally axially but the spring force acts radially outwardly on its other margin, whose face is thus maintained in sliding contact with the axially extending internal annular seating face 14 of an annular flange 16 of the member 7.

Maintenance of the contact between the diaphragm 8 and the seating face 14 is assisted by a series of angled bias leaf springs 17 one end of each spring 17 being clamped between a clamping plate 13 and the flange 11, the other end bearing against the radially inner side of the diaphragm 8 at a position spaced from the area of contact with the seating face 14.

It will be appreciated that the excess pressure in the space 3 assists in maintaining contact between the diaphragm 8 and the face 14.

Various modifications may be made in the seal described above. The diaphragm may be laminated, with layers of progressively less width backing the actual sealing layer.

I claim:

1. A gas-tight seal for the closure of a perimeter space between a duct and a surrounding structure, which space changes due to lateral relative expansion movement between the duct and structure, comprising a spring tempered metal annular diaphragm of generally axially extending, sideways overlapping strip means, the diaphragm having one margin fixed to an annular member for securement in relation to one of the duct and the structure, the other margin of said diaphragm having a face sliding over and biased radially by spring pressure of the diaphragm into contact with a generally axially extending annular seating face for securement in relation to the other of the duct and the structure.

2. The seal according to claim 1, further comprising auxiliary loading means for assisting the spring pressure of the diaphragm.

3. The seal according to claim 2, wherein said auxiliary loading means comprise bias leaf springs acting on said overlapping strip means.

4. The seal according to claim 1, said one annular member being fixed to the duct, a second annular member having said annular seating face fixed to said structure, a said diaphragm one margin of which is fixed to an axially extending annular outer surface of an annular flange of said one annular member, the other margin of the diaphragm being maintained in sliding contact with said axially extending internal annular seating face of an annular flange of said second annular member.

5. The seal according to claim 1, wherein said sideways overlapping strip means comprise sideways overlapping leaf springs.

* * * * *